United States Patent Office 3,485,037
Patented Dec. 23, 1969

3,485,037
HYDRAULIC POWER SYSTEMS
Robert Cecil Clerk, 2 Trafford Road,
Reading, Berkshire, England
Filed July 11, 1967, Ser. No. 652,522
Claims priority, application Great Britain, Sept. 28, 1966,
43,360/66
Int. Cl. F03g 3/08; F04b 17/00
U.S. Cl. 60—10                                    6 Claims

ABSTRACT OF THE DISCLOSURE

An hydraulic power system employing a laminated flywheel operating in a vacuum to store energy applied to it by an hydraulic motor and to dispense that energy through the medium of an hydraulic pump.

---

This invention concerns improvements in hydraulic power systems and is directed to the provision of systems making use of energy stored in a flywheel to drive such items of equipment as fork-lift trucks, industrial tractors, cranes, urban delivery vehicles, golf buggies and the like.

According to the invention I provide an hydraulic power system comprising a flywheel operating in an evacuated casing for storing kinetic energy, an hydraulic motor for energising the said flywheel and a variable delivery hydraulic pump driven by the said flywheel for the emission of the stored energy in the form of usable hydraulic power.

In cases where the required period of energy output is short it is possible to use a dual purpose pump and motor unit for both duties of imparting energy to the flywheel and using stored energy, but is generally preferred to use a separate motor for energy build-up.

Where the power system is to be utilised in vehicles the flywheel shaft should be vertical so as to avoid undesirable gyroscopic effects when negotiating corners; for static uses the flywheel attitude is immaterial.

Energy build-up may be derived from a central station where a pump driven electrically or by a prime mover is connected to large bore delivery and return pipes permitting low fluid velocity. The pipes are preferably flexible and are provided with quick action connectors for attachment to connectors of the power system motors of several individual power-using units.

Alternatively, in the case of such units as fork lift trucks which operate part of the time out of doors, the units may each carry a prime mover such as a diesel engine which is put into operation only in the open air to recuperate flywheel energy.

The flywheel casing may be hermetically sealed, in which case any unavoidable loss of vacuum may be made good periodically at a central depot, or where lubrication or other considerations require constant maintenance of vacuum the vehicle or like unit may carry a constantly driven vacuum pump.

Theoretically a correctly designed laminated flywheel of the reasonable diameter of 3′ 6″, whose laminations are formed from high tensile steel stressed within acceptable limits, is capable of storing up to 30 H.P. hours. Less highly stressed flywheels of such diameter can be expected to store nearly half of the above energy; and flywheels of this kind can be readily constituted using conventional techniques.

The system of the invention is particularly useful in situations where very large power outputs are required for short periods at intervals. For example, a crane erected upon a construction site may have a power demand of tens of horse power over a total of but an hour or two of a working day. The provision of electric power cables for such a crane may well be prohibitive, but by employing the power system of the invention energy may be built up slowly by a low powered motor and pump running continuously.

Hydraulic pumps and motors of piston or blade type of adequate performance in the system of the invention are commercially available at the present time, but it is envisaged that more efficient hydro-kinetic converters suitable for the system can be developed.

To mitigate against flywheel windage losses and consequent heating, the flywheel casing is evacuated to a residual air vacuum of 5 torr or a residual hydrogen vacuum of 75 torr. The former condition requires the use of a high efficiency pump running constantly and such a pump may take the form of a gear pump supercharged with scavenging oil. The residual hydrogen vacuum is easily maintained.

A vehicle fitted with the power system of the invention with a dual purpose pump and motor and used on ramps or grades may recuperate on down grades energy dissipated in other ways as the flywheel operates as a brake.

A one-way by-pass valve from motor suction to delivery may be incorporated to ensure against overspeeding and overstressing of the flywheel under initial energy input conditions or under recuperation in use. Such a valve may be used in conjunction with a thermostatic switch operating audible or visible warnings.

The invention is exemplified by the following description of one preferred form of hydraulic power system adapted for vehicle drive which is illustrated in the accompanying drawings in which:

FIGURE 3 is a schematic view showing the principles of the hydraulic system.

Figure 1:
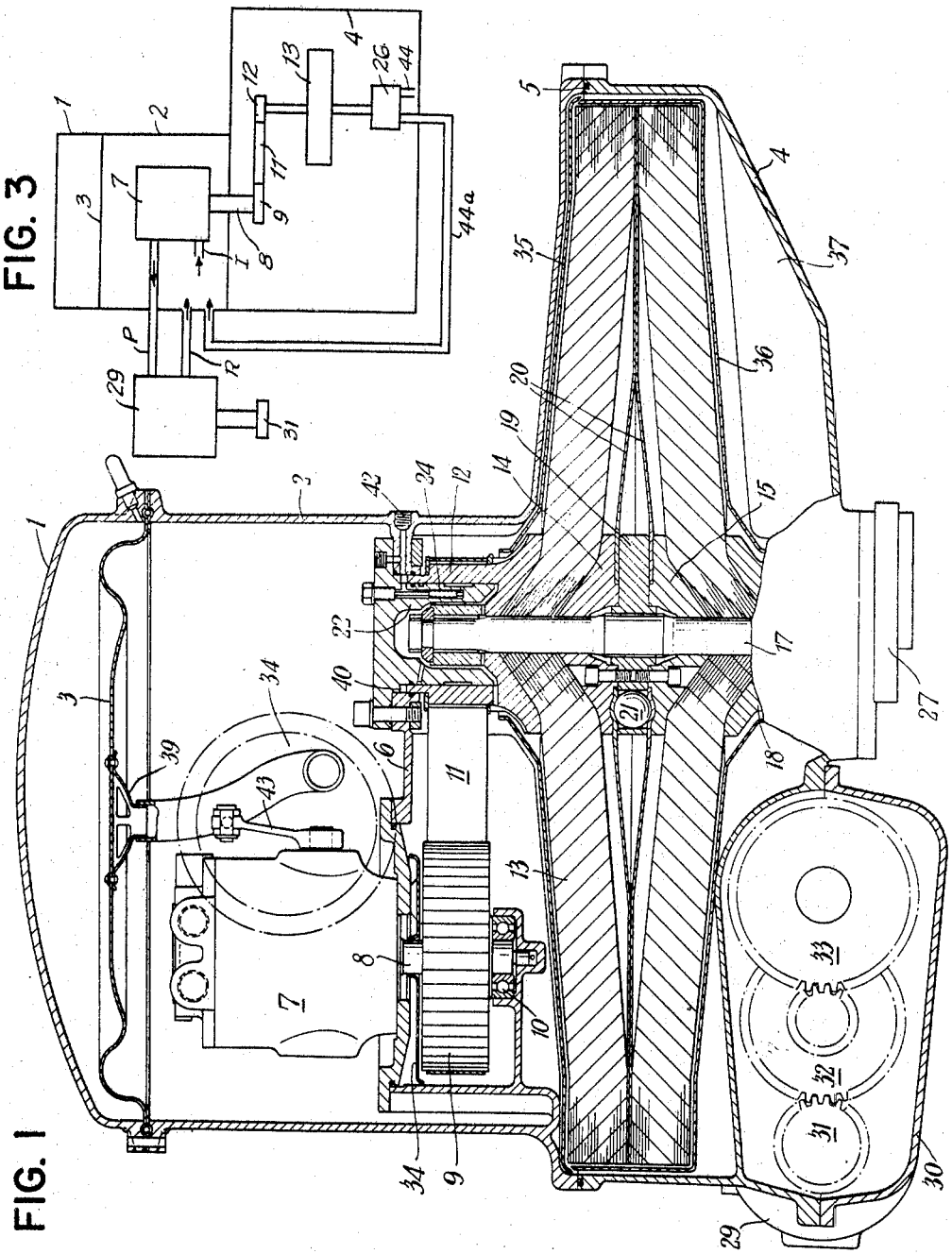
FIG. 1 is a central vertical section of a complete power unit.
Figure 2:
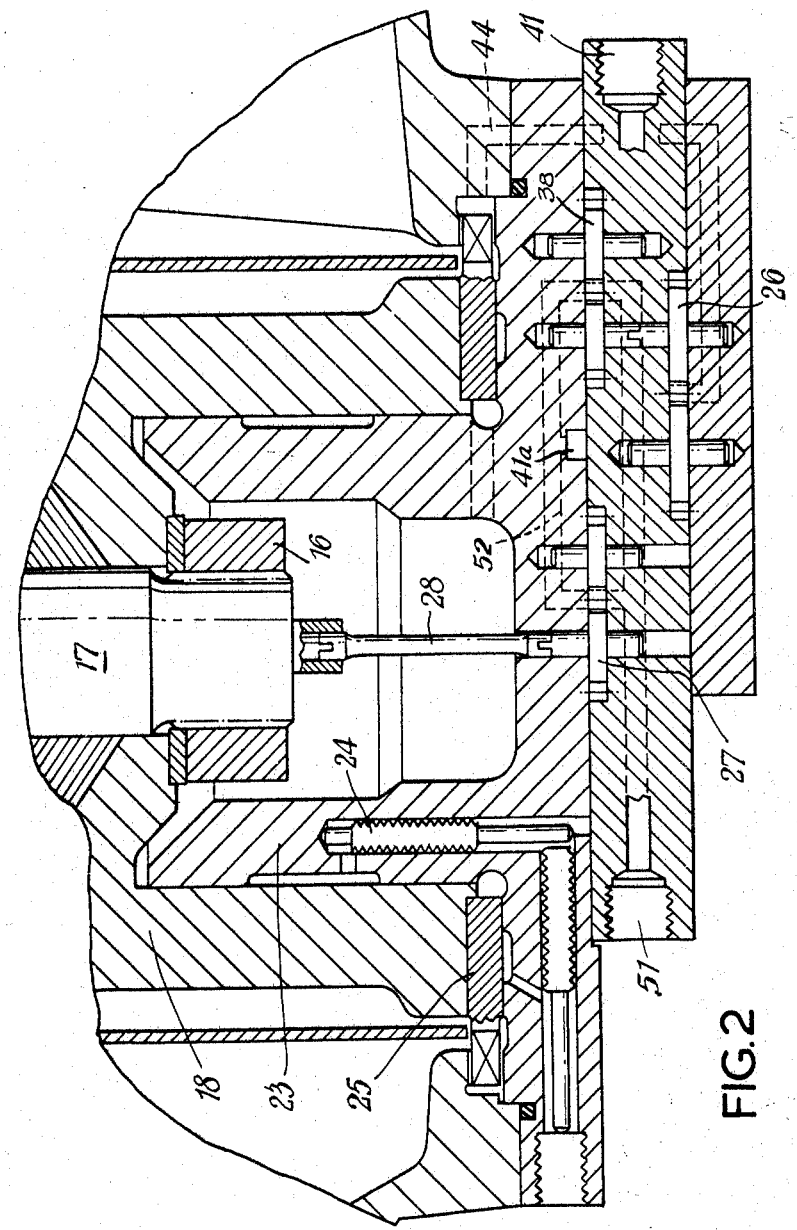
FIG. 2 is a similar view of FIG. 1 showing a lower support assembly to a larger scale.

Referring first to FIG. 1, there is shown a power unit casing made in three main parts, the top portion 1 is of domed shape and is separated from the central portion 2 by a flexible diaphragm 3.

The lower portion 4 is grooved in its upper face for reception of a sealing gasket 5.

The space between the casing portion 1 and the diaphragm 3 is pressurised to 30 p.s.i. with compressed air and this pressure is transmitted through the diaphragm to an air-free oil reservoir provided within the casing portion 2 above a generally horizontal partition 6 therein.

A variable stroke motorable pump 7 is mounted upon the partition 6 with its vertical driving shaft 8 extending down into the lower part of the casing defined between that partition and the lower casting 4.

The shaft 8 carries a toothed drum 9, and its lower end is carried in a ball bearing 10.

A gear belt or chain 11 connects the drum 9 to the outer toothed periphery of the upper bearing cup 12 of a laminated flywheel 13.

The flywheel 13 is made up from two sets of twenty-five centrally dished steel laminations which are pre-stressed about axial pre-load spacers 14 and 15 by a nut 16 on the flywheel shaft 17 bearing against the lower bearing cup 18.

A splined driving hub 19 locked between the spacers 14 and 15 transmits energy between the laminations of the flywheel and the shaft 17 through the medium of a pair of tapered aluminium drive plates 20, which are locked to the hub by one or more spherical dowels 21.

The bearing cups 12 and 18 rotate with the flywheel upon upper and lower bearing plugs 22 and 23 respectively.

The bearing plugs are each formed with three equally spaced lands and are supplied from a gallery with high pressure oil (at 400 p.s.i.) through the medium of three impedance plugs 24 to provide a self-centering effect, the arrangement being such that reduced clearance at any one land due to partial eccentricity between cup and plug causes an increase in oil pressure at the associated land due to a reduced pressure drop across its associated impedance 24.

The lower face of the lower bearing cup 18 is normally supported by high pressure oil applied to an annular gallery formed below a thrust washer 25. This thrust washer is faced with polytetrafluoroethylene upon its upper surface to give a very low friction support when the flywheel is running down and oil pressure is diminishing. It is also formed with peripheral vanes for centrifugal feed of oil to a vacuum/oil scavenge pump 26.

An annular oil gallery 40, supplying the upper cup bearing with high pressure oil fed from union 41 to union 42 by an external pipe (not shown), is arranged above an annular lip on the upper face of the upper cup. The pressure in the gallery 40 supplies a counterthrust to upward movement of the flywheel as would be caused by sudden descent of the vehicle.

The pump 27 for high pressure oil supply is normally driven by a quill 28 fitted to the base of the flywheel shaft 17, and through a gear type motor 38 drives the vacuum/oil scavenge pump 26 but under running-up conditions the gear motor 38 is powered by high pressure oil from an external pressure source delivered through union 41 via a gallery 41a and exhausting to a reservoir (not shown) through a union 51. Oil for the pump bearings is derived from the upper chamber.

A variable stroke hydraulic motor 29 is fixed to the lower part of the casing portion 4 and to the sump 30 of a gear case which houses gears 31 and 32 and differential 33 from which the half shafts of the vehicle are powered.

The motor 29 is of the type which can operate as a pump on overrun. It is normally supplied with oil from and exhausts to the motorable pump 7 through external pipes (not shown) and on overrun returns oil to the inlet of the pump 7 which in these circumstances acts as a motor.

A valve block indicated diagrammatically by broken lines at 34 provides an inlet from and return to an external high pressure oil supply as well as inlet and outlet connections to the motorable pump 7, connections to and from the hydraulic motor 29 and a connection to the high pressure supply to the bearings. This bearing oil supply is derived from the external source on running up and from the pump 27 under running conditions.

A degree of oil leakage (of the order of 1½ gallons per minute) takes place from the pump 7 under maximum pressure conditions and a drip shield 34 is provided to guard the drum 9 from this.

Similarly a shield 35 is provided for the flywheel and a secondary shield 36 to prevent splash from oil surge in the sump 37 to which the leakage from pump 7 finally flows for extraction by the scavenge pump 26.

The capacity of the sump 37 is great enough to accommodate an accumulation of oil leakage from the pump 7 under maximum pressure conditions, such as when the vehicle is accelerating. The accumulation may reach quite large proportions, since the capacity of the pump 26 is low so as not to absorb too much power; however it is able to clear the sump over a period of time.

The power system operates as follows: imagine the whole system stationary with the chamber surrounding the pump 7 filled with de-aerated oil; an external source of high pressure oil derived from a prime mover-driven pump, accumulator or the like is connected through large bore hoses to the supply and return connections of the valve block 34 and from thence to the motorable variable stroke pump 7 via an external connecting pipe (not shown). The pump 7, acting as a motor, drives shaft 8 and drum 9 and through belt 11 the cup bearing 12, the flywheel and its shaft 17.

At this initial start up time the hydro-static bearings of the flywheel are supplied with high pressure oil directly from the outside pressure source via the valve block 34, and the scavenge and vacuum pump 26 is driven by the gear motor 38 powered from the same source through union 41 and gallery 41a.

The lower part of the casing is rapidly evacuated to a residual air vacuum of the order of five torr through the gallery 44, while the oil in the upper part of the casing is maintained at 30 p.s.i. by venting any surplus through a valve to the external source through a floating vent 39 carried by the diaphragm 3.

In due course the motorable pump 7 is brought up to its maximum governed speed (6,450 r.p.m.) at which time the flywheel is rotating in vacuum at approximately 10,200 r.p.m.

The stroke of the motorable pump 7 is reduced to zero and the hoses from the external pressure source are disconnected.

The high pressure oil pump 27 is now being driven from the flywheel shaft through the quill 28, and the sump 37 is kept free of oil by the pump 26 still being driven by the gear motor 38.

FIGURE 3 shows the hydraulic circuitry with which the invention is principally concerned. As shown, the pressurized reservoir 2 within which the pump/motor 7 is submerged supplies fluid to the pump/motor 7 through its inlet I whereas its high pressure outlet P is connected as the inlet to the pump/motor 29. The outlet of the pump/motor 29 provides a return line R to the reservoir 2. The scavenging pump 26 evacuates the sealed portion 4 of the casing which contains the flywheel 13 and returns the scavenged oil through the return line 44a. The scavenging pump 26 may be driven directly from the flywheel if desired or, as above described, may be driven indirectly through the medium of pump 27 and gear motor 38.

To put the vehicle in motion the function of the motorable pump 7 is changed by its control lever 43 to cause it to act as a pump driven by the flywheel through the belt 11 and toothed drum 9. The output of the pump 7 is led to the hydraulic motor/pump 29 from whence it is returned to the inlet of pump 7. Speed of the vehicle is controlled in accordance with the stroke of the pump 7.

When the vehicle is on overrun, for example descending a hill, the motor/pump 29 is caused to act as a pump and the motorable pump 7 is adjusted to act as a motor. In this way energy is recovered and is transmitted back to the flywheel.

I claim:

1. An hydraulic system comprising, in combination,
 a casing,
 a flywheel rotatably mounted in said casing,
  pump means driven by said flywheel for evacuating said casing and maintaining a negative pressure therein,
 a first hydraulic pump/motor connected to said flywheel and having an inlet and outlet,
 a second hydraulic pump/motor, said second hydraulic pump/motor having an inlet connected to the outlet of said first hydraulic pump/motor and an outlet connected to the inlet of said first hydraulic pump/motor, whereby energy may be extracted from and applied to said flywheel through the hydraulic system.

2. The hydraulic power system according to claim 1 wherein said second hydraulic pump/motor is connected to an output shaft for imparting and receiving drive.

3. The hydraulic power system according to claim 1 wherein said first hydraulic pump is mounted on said casing externally thereof, a housing on said casing and enclosing said first hydraulic pump/motor, a flexible diaphragm in said housing dividing same into separate chambers, one of which contains said first hydraulic pump/motor and is adapted to receive a reservoir of hydraulic fluid, and the other of which is adapted to receive gas under pressure for maintaining a positive pressure of hydraulic fluid in said one chamber.

4. A vehicle drive system comprising, in combination,
a sealed casing, a vertical shaft rotatable mounted in said casing and a flywheel, attached to said shaft, said casing having an upper wall member having an opening,
a first hydraulic pump/motor having a drive shaft, a mounting plate for said pump closing said opening in said upper wall of the casing with said drive shaft projecting into said casing,
means drivingly connecting said drive shaft with said flywheel,
said casing having a housing portion surrounding said first hydraulic pump/motor and surmounted by a flexible diaphragm so that the said upper wall, said housing portion and said flexible diaphragm define a closed chamber containing said first hydraulic pump/motor,
a cup connected to said housing portion and defining a closed chamber above said flexible diaphragm, means for introducing pressurized gas into said chamber above said flexible diaphragm, said casing having a sump below said flywheel, a scavenge pump in said sump and connected to said flywheel for evacuating said casing to maintain a negative pressure therein,
a vehicle drive member,
and a second hydraulic pump/motor connected to said drive member for imparting drive to and receiving drive from said vehicle drive member, said first hydraulic pump/motor and said second hydraulic pump/motor being connected in a closed hydraulic fluid circuit for receivng from and imparting drive to said flywheel.

5. The system as defined in claim 4 wherein a baffle plate is provided within said casing in covering relationship to said flywheel.

6. The system as defined in claim 5 including a second baffle plate within said casing below said opening and in surrounding relationship to said drive shaft.

References Cited

UNITED STATES PATENTS 2,935,899   5/1960   Nallinger.

FOREIGN PATENTS 507,710   6/1939   Great Britain.

ROBERT M. WALKER, Primary Examiner

U.S. Cl. X.R.

74—572; 103—43